US012633117B2

(12) United States Patent
Tian et al.

(10) Patent No.: US 12,633,117 B2
(45) Date of Patent: May 19, 2026

(54) METHOD FOR EXTRACTING URBAN FLOOD INUNDATION EXTENT BASED ON REMOTE SENSING IMAGES

(71) Applicant: Nanjing University of Information Science & Technology, Nanjing (CN)

(72) Inventors: Ye Tian, Nanjing (CN); Shunan Xiang, Nanjing (CN); Bingrong Zhou, Xining (CN); Guoqing Wang, Nanjing (CN)

(73) Assignee: Nanjing University of Information Science & Technology, Nanjing (CN)

( * ) Notice: Subject to any disclaimer, the term of this patent is extended or adjusted under 35 U.S.C. 154(b) by 0 days.

(21) Appl. No.: 19/307,206

(22) Filed: Aug. 22, 2025

(65) Prior Publication Data

US 2026/0065669 A1     Mar. 5, 2026

(30) Foreign Application Priority Data

Aug. 27, 2024     (CN) .......................... 202411179155.6

(51) Int. Cl.
*G06V 20/10*          (2022.01)
*G01S 13/89*          (2006.01)
(Continued)

(52) U.S. Cl.
CPC ............ *G06V 20/176* (2022.01); *G01S 13/89* (2013.01); *G06T 3/4053* (2013.01); *G06T 5/10* (2013.01); *G06T 5/20* (2013.01); *G06T 7/11* (2017.01); *G06V 10/764* (2022.01); *G06V 20/13* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

2022/0405883 A1* 12/2022 Gou ...................... G06T 3/4053

OTHER PUBLICATIONS

Nanjing University of Information Science and Technology (Applicant), Replacement Claims (allowed) of CN202411179155.6, Sep. 23, 2024.

(Continued)

*Primary Examiner* — Christopher Braniff
(74) *Attorney, Agent, or Firm* — Hemisphere Law, PLLC

(57)          ABSTRACT

A method for extracting urban flood inundation extent based on remote sensing images includes: acquiring and preprocessing a Fengyun-4 satellite remote sensing image to obtain a preprocessed remote sensing image, and dividing the preprocessed remote sensing image into a thin cloud area and a thick cloud area; removing thin clouds and thick clouds in the preprocessed remote sensing image; extracting a first water body area from the cloud-removed remote sensing image to obtain a first urban inundation extent; acquiring a radar image at a same region and a same time as the remote sensing image, and extracting a second water body area from the radar image to obtain a second urban inundation extent; and training a super-resolution convolutional neural network according to the first urban inundation extent and the second urban inundation extent, and using a trained super-resolution convolutional neural network to obtain a reconstructed higher-resolution urban flood inundation extent.

6 Claims, 2 Drawing Sheets acquiring and preprocessing a remote sensing image from a Fengyun-4 satellite to obtain a preprocessed remote sensing image, and dividing the preprocessed remote sensing image by using a convolutional neural network into a thin cloud area and a thick cloud area removing thin clouds in the thin cloud area by homeomorphic filtering, and removing thick clouds in the thick cloud area by a replacement method, to thereby obtain a cloud-removed remote sensing image extracting a first water body area from the cloud-removed remote sensing image to obtain a first urban inundation extent acquiring a radar image at a same region and a same time, and extracting a second water body area from the radar image by using a maximum between-class variance method to obtain a second urban inundation extent training a super-resolution convolutional neural network according to the first urban inundation extent and the second urban inundation extent to obtain a trained super-resolution convolutional neural network, and using the trained super-resolution convolutional neural network to obtain a reconstructed higher-resolution urban flood inundation extent

(51) Int. Cl.
| | |
|---|---|
| *G06T 3/4053* | (2024.01) |
| *G06T 5/10* | (2006.01) |
| *G06T 5/20* | (2006.01) |
| *G06T 7/11* | (2017.01) |
| *G06V 10/764* | (2022.01) |
| *G06V 20/13* | (2022.01) |

(56) References Cited

OTHER PUBLICATIONS

CNIPA, Notification to grant patent right for invention in CN202411179155.6, Sep. 29, 2024.

* cited by examiner acquiring and preprocessing a remote sensing image from a Fengyun-4 satellite to obtain a preprocessed remote sensing image, and dividing the preprocessed remote sensing image by using a convolutional neural network into a thin cloud area and a thick cloud area removing thin clouds in the thin cloud area by homomorphic filtering, and removing thick clouds in the thick cloud area by a replacement method, to thereby obtain a cloud-removed remote sensing image extracting a first water body area from the cloud-removed remote sensing image to obtain a first urban inundation extent acquiring a radar image at a same region and a same time, and extracting a second water body area from the radar image by using a maximum between-class variance method to obtain a second urban inundation extent training a super-resolution convolutional neural network according to the first urban inundation extent and the second urban inundation extent to obtain a trained super-resolution convolutional neural network, and using the trained super-resolution convolutional neural network to obtain a reconstructed higher-resolution urban flood inundation extent

FIG. 1 n₁ feature maps of
low-resolution image n₂ feature maps of
low-resolution image

METHOD FOR EXTRACTING URBAN FLOOD INUNDATION EXTENT BASED ON REMOTE SENSING IMAGES

CROSS-REFERENCE TO RELATED APPLICATION

This application claims priority to Chinese Patent Application No. 202411179155.6, filed on Aug. 27, 2024, which is herein incorporated by reference in its entirety.

TECHNICAL FIELD

The disclosure relates to the field of image processing technology, and more particularly to a method for extracting urban flood inundation extent based on remote sensing images.

BACKGROUND

Flood disasters are characterized by large affected areas, strong suddenness, and severe damage, posing serious threats to people's lives and property. In recent years, influenced by global climate change, urban flood disasters have occurred frequently and have become one of major natural disasters affecting urban development. Conducting urban flood disaster monitoring and formulating urban flood emergency plans are of great significance.

The key to flood disaster monitoring lies in the accurate identification of surface water information and real-time statistics of flooded areas. Traditional methods mainly include manual field inspections, hydrological monitoring stations, drones, and remote sensing technology. Monitoring flood disasters through traditional manual investigation methods has drawbacks such as long cycles, high risk, and large resource consumption. Satellite remote sensing technology, with advantages such as its wide coverage, high timeliness, and large information volume, can compensate for shortcomings of traditional techniques and has been widely applied in flood disaster monitoring and assessment, water resource surveys, and other fields.

Research on flood disaster monitoring based on polar-orbiting satellite data has become relatively mature. With the aid of high spatial resolution images, preliminary extraction of flood inundation extents can be realized. However, flood disasters generally occur during heavy rainfall events, and optical image data are subject to cloud cover, making it difficult to acquire surface information at the time of the disaster, which limits the ability to comprehensively monitor flood inundation conditions. Typically, water indices are used for extracting small water bodies, but high-resolution satellite images generally only have visible and near-infrared bands, while water indices require middle-infrared and short-wave infrared bands, thus necessitating coordination with low-resolution satellites for flood inundation extraction.

Furthermore, the revisit period of the polar-orbiting satellite often spans several days, which may result in missing urban flood inundation events and cannot fully meet the timeliness and continuity requirements of flood disaster monitoring. Although synthetic aperture radar (SAR) is not affected by clouds, fog, or precipitation and can provide all-weather satellite observations, its scanning range cannot cover the entire flooded area, leading to limited monitoring coverage.

Therefore, relying solely on the polar-orbiting satellites or radar cannot fully satisfy the timeliness and effective monitoring range requirements of flood disaster monitoring.

SUMMARY

In order to solve the problems described above, the disclosure provides a method for extracting urban flood inundation extent based on remote sensing images.

Technical solutions are as follows. the method for extracting urban flood inundation extent based on the remote sensing image includes:

acquiring and preprocessing a remote sensing image from a Fengyun-4 satellite to obtain a preprocessed remote sensing image, and dividing the preprocessed remote sensing image by using a convolutional neural network into a thin cloud area and a thick cloud area;

removing thin clouds in the thin cloud area by using homomorphic filtering, and removing thick clouds in the thick cloud area by using a replacement method, to thereby obtain a cloud-removed remote sensing image;

extracting a first water body area from the cloud-removed remote sensing image to obtain a first urban inundation extent;

acquiring a radar image at a same region and a same time as the remote sensing image, and extracting a second water body area from the radar image by using a maximum between-class variance method to obtain a second urban inundation extent; and training a super-resolution convolutional neural network according to the first urban inundation extent and the second urban inundation extent to obtain a trained super-resolution convolutional neural network, and using the trained super-resolution convolutional neural network to obtain a reconstructed higher-resolution urban flood inundation extent.

In an embodiment, the method further includes: integrating the reconstructed higher-resolution urban flood inundation extent into a map to thereby achieving flood inundation early warning and monitoring, evacuation, rescue resources allocation and disaster relief.

In an embodiment, a processor such as a central processing unit (CPU) is configured for the preprocessing of remote sensing images (normalization, cropping, geometric correction), standardization of radar images, histogram statistics, and other routine operations. A graphics processor such as a graphics processing unit (GPU) is configured for model training and inference of the convolutional neural network and the super-resolution convolutional neural network. The GPU is good at parallel computing and can greatly improve the efficiency of steps such as image feature extraction, convolution operations, and nonlinear mapping. A memory (RAM/hard disk/cloud storage) is used to store remote sensing raw images, cloud-free images, intermediate results, training sets, model parameters, and other data.

In an embodiment, the removing thin clouds in the thin cloud area by homomorphic filtering includes:

decomposing the thin cloud area of the remote sensing image into multiple single-band remote sensing images, and removing the thin clouds from the multiple single-band remote sensing images separately.

In an embodiment, the removing the thin clouds from the multiple single-band remote sensing images separately includes:

modeling the thin cloud area of the remote sensing image mathematically as:

$$f_s(x, y) = f_i(x, y) \times f_r(x, y),$$

where a two-dimensional function $f_s(x,y)$ represents the thin cloud area of the remote sensing image, where x and y represent position coordinates of each pixel on a two-dimensional remote sensing image; $f_i(x,y)$ represents an incident component contained in the remote sensing image as a thin cloud illumination component, and $f_r(x,y)$ represents a reflected component contained in the remote sensing image as a ground reflection component;

transforming logarithmically the thin cloud area of the remote sensing image to separate the thin cloud illumination component and the ground reflection component of the remote sensing image to obtain a logarithmic transformation result $Inf_s(x,y)$, through the following formula:

$$Inf_s(x, y) = Inf_i(x, y) + Inf_r(x, y),$$

performing a Fourier transform on the logarithmic transformation result $Inf_s(x,y)$ to reduce the thin cloud illumination component to obtain a Fourier transform result $S(u,v)$, through the following formulas:

$$F\{Inf_s(x, y)\} = F\{Inf_i(x, y) + F\{Inf_r(x, y)\},$$

let $S(u, v) = F\{Inf_s(x, y), I(u, v) = F\{Inf_i(x, y),$ $$R(u, v) = F\{Inf_r(x, y)\}, \text{ then obtaining: } S(u, v) = I(u, v) + R(u, v),$$

using a high-pass filter to suppress a low-frequency component $I(u,v)$ and extract a high-frequency component $R(u,v)$ of the Fourier transform result $S(u,v)$ to obtain a high-pass filtered result $p(u, v)$, through the following formula $$p(u, v) = S(u, v) \times H(u, v) = I(u, v) \times H(u, v) + R(u, v) \times H(u, v),$$

where $H(u,v)$ represents a transfer function of the high-pass filter;

performing an inverse Fourier transform on the high-pass filtered result $p(u,v)$ to obtain an inverse Fourier transform result $p(x,y)$, through the following formulas:

$$p(x, y) = F^{-1}\{p(u, v)\} = F^{-1}\{I(u, v) \times H(x, y)\} + F^{-1}\{R(u, v) \times H(x, y)\},$$

let $i(x, y) = F^{-1}\{I(u, v) \times H(x, y)\}, r(x, y) = F^{-1}\{R(u, v) \times H(x, y)\},$ then obtaining $p(x, y) = i(x, y) + r(x, y),$ and performing an exponential transformation on the inverse Fourier transform result $p(x,y)$, through the following formula:

$$g(x, y) = \exp\{i(x, y)\} + \exp\{r(x, y)\},$$

-continued let $i_0(x, y) = \exp\{i(x, y)\}, r_0(x, y) = \exp\{r(x, y)\},$ where $i_0(x,y)$ represents a processed thin cloud illumination component, and $r_0(x,y)$ represents a processed ground reflection component;

where an expression of the remote sensing image after removing the thin clouds by using the homomorphic filtering is:

$$g(x, y) = i_0(x, y) + r_0(x, y).$$

In an embodiment, the removing thick clouds in the thick cloud area by using a replacement method includes:

obtaining a cloud-free remote sensing image and a cloud-covered remote sensing image at the same region captured by the Fengyun-4 satellite at different times or by different sensors, performing geocoding to ensure that coordinate systems of the cloud-free remote sensing image and the cloud-covered remote sensing image are consistent, and replacing cloud-covered areas in the cloud-covered remote sensing image with corresponding areas from the cloud-free remote sensing image on registered remote sensing images.

In an embodiment, the extracting a first water body area from the cloud-removed remote sensing image to obtain a first urban inundation extent includes:

calculating, based on cloud-removed remote sensing image data, a modified normalized difference water index (MNDWI) according to a green-band reflectance and a short-wave infrared band reflectance, through the following formula:

$$MNDWI = \frac{\rho_{Green} - \rho_{MIR}}{\rho_{Green} + \rho_{MIR}},$$

where $\rho_{Green}$ represents the green-band reflectance, and $\rho_{MIR}$ represents the short-wave infrared band reflectance;

classifying a part of the cloud-removed remote sensing image with the MNDWI greater than a threshold $MNDWI_0$ as a first target water body, classifying another part of the cloud-removed remote sensing image with the MNDWI less than or equal to the threshold as a first background, and determining the part of the cloud-removed remote sensing image corresponding to the first target water body as the first urban inundation extent; and calculating, based on the first target water body, the first water body area using the following formula:

$$A_w = \frac{P_w A_{total}}{P_{total}},$$

where $P_w$ represents a number of water pixels in a study region, $P_{total}$ represents a total number of pixels in the study region, $A_w$ represents the first water body area in the study region, and $A_{total}$ represents a total image area of the study region.

In an embodiment, the extracting a second water body area from the radar image by using a maximum between-class variance method to obtain a second urban inundation extent includes:

converting the radar image into a grayscale image and performing normalization on the grayscale image to map pixel values of the grayscale image into a range of 0-255;

counting a number of pixels at each gray level in the grayscale image to form a gray-level histogram;

calculating a total number N of pixels in the grayscale histogram, through the following formula:

$$N = \sum (n_i)$$

where $n_i$ represents a total number of pixels with a gray level i in the grayscale histogram, and i is in a range of 0-255;

calculating a probability of each gray level, through the following formula:

$$pi = n_i/N$$

dividing the pixels in the grayscale histogram into two classes according to a pixel value threshold $t_0$, where a pixel set with pixel values less than $t_0$ is recorded as a class A, and a pixel set with pixel values greater than or equal to $t_0$ is recorded as a class B;

calculating a weight $p_A(t)$ of the class A and a weight $p_B(t)$ of the class B, through the following formulas:

$$p_A(t) = \sum_{0 \le i < t_0} p_i,$$

$$p_B(t) = \sum_{t_0 \le i < 225} p_i,$$

calculating a grayscale mean $m_A(t)$ of the class A and a grayscale mean $m_B(t)$ of the class B through the following formulas:

$$m_A(t) = \frac{\sum_{0 \le i < t_0} (i \times p_i)}{P_A(t)},$$

$$m_B(t) = \frac{\sum_{t_0 \le i < 225} (i \times p_i)}{P_B(t)},$$

calculating a grayscale mean of the grayscale image through the following formula:

$$m_G = \sum_{0 \le i \le 255} (i \times p_i),$$

calculating a between-class variance between the class A and the class B through the following formula:

$$\sigma^2 = p_A(t) \times (m_A(t) - m_G)^2 + p_B(t) \times (m_B(t) - m_G)^2,$$

traversing all target pixel value thresholds $t_0$ from 0 to 255, calculating the between-class variance $\sigma^2$ corresponding to each of the target pixel value thresholds, and finding a pixel value threshold t* of the target pixel value thresholds corresponding to a maximum between-class variance $\sigma^2$ of the between-class variances $\sigma^2$ corresponding to the target pixel value thresholds; and binarizing the grayscale image using the pixel value threshold t* of the target pixel value thresholds corresponding to the maximum between-class variance $\sigma^2$, including: setting pixels with pixel values less than t* to 0 to represent a second background, and setting pixels with pixel values greater than or equal to t* to 255 to represent a second target water body; and determining a part of the radar image corresponding to the second target water body as the second urban inundation extent; and calculating the second water body area based on the second target water body.

In an embodiment, the training a super-resolution convolutional neural network according to the first urban inundation extent and the second urban inundation extent to obtain a trained super-resolution convolutional neural network includes:

using the first urban inundation extent as an input of the super-resolution convolutional neural network, and the second urban inundation extent as an output of the super-resolution convolutional neural network, to train the super-resolution convolutional neural network to thereby obtain the trained super-resolution convolutional neural network.

In an embodiment, the using the trained super-resolution convolutional neural network to obtain a reconstructed higher-resolution urban flood inundation extent includes:

inputting the remote sensing image into the trained super-resolution convolutional neural network to obtain the reconstructed higher-resolution urban inundation extent.

Beneficial effects: compared with the related art, the significant advantages of the present invention are as follows.

The disclosure combines the optical remote sensing image with low spatial resolution but high timeliness and the radar image with high spatial resolution but lower temporal resolution, using a deep learning method to perform super-resolution processing via the super-resolution convolutional neural network, thereby obtaining the urban flood inundation image during the disaster period that satisfy both temporal and spatial resolution requirements. This meets the timeliness demands of flood disaster monitoring, effectively compensates for the long revisit cycle of polar-orbiting satellites and the low spatial resolution of optical satellites during flood disaster monitoring, and possesses good economic efficiency, practicality, and flexibility.

BRIEF DESCRIPTION OF DRAWINGS

FIG. 1 illustrates a flowchart of a method for extracting urban flood inundation extent based on remote sensing images.

DETAILED DESCRIPTION OF EMBODIMENTS

Figure 2:
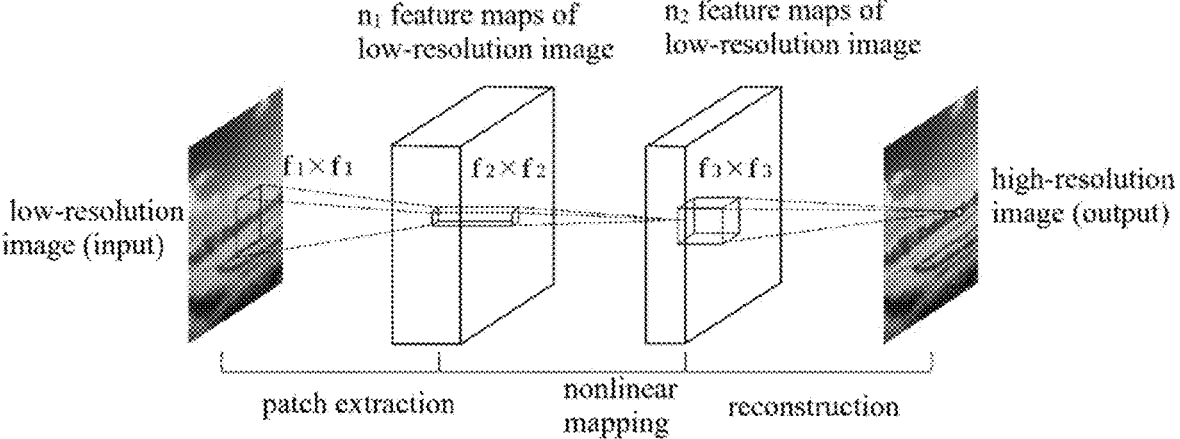
FIG. 2 illustrates a diagram of a working principle of a super-resolution convolutional neural network.

To make the purpose, technical solutions, and advantages of the disclosure clearer, the following further detailed description is provided in conjunction with the accompanying drawings and embodiments.

Figure 1:
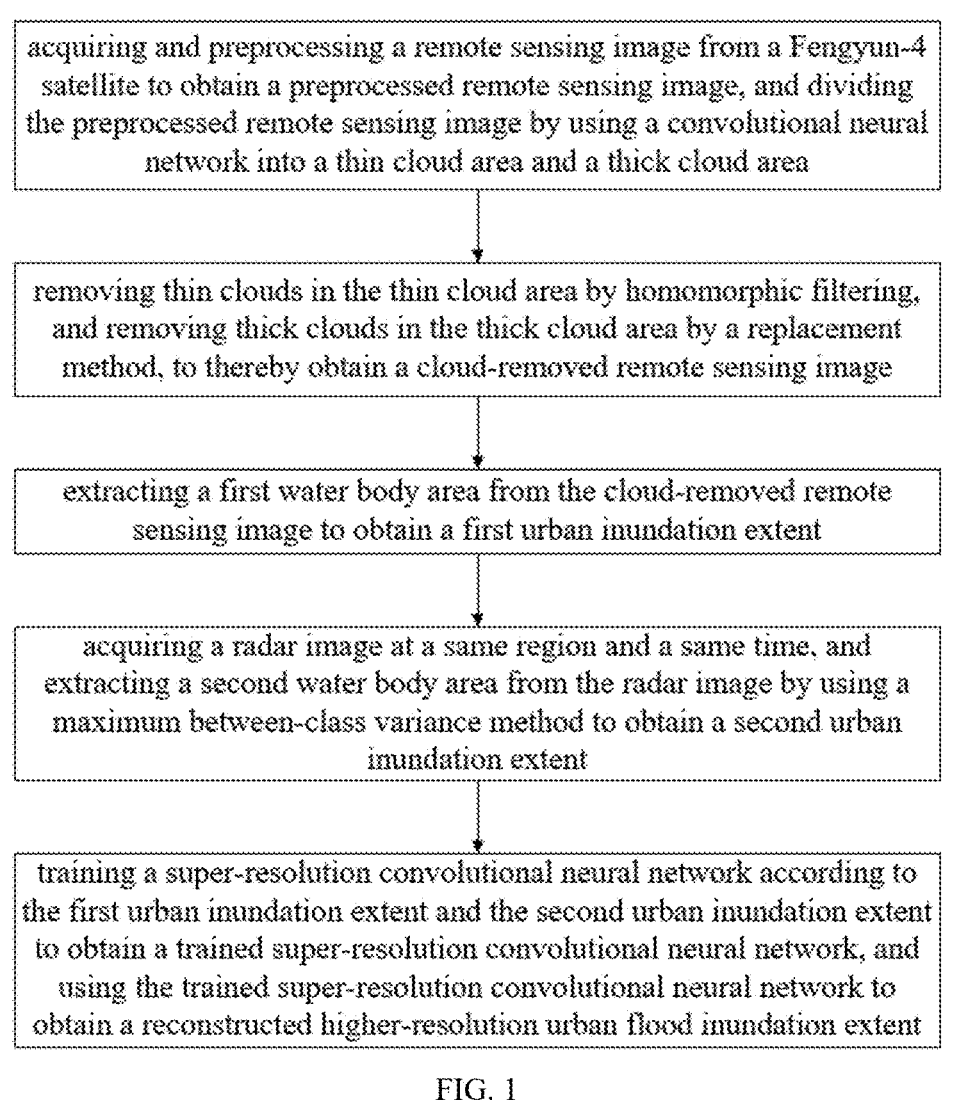

An embodiment of the disclosure provides a method for extracting urban flood inundation extent based on remote sensing images, with a flowchart as shown in FIG. 1. The method includes:

acquiring and preprocessing a remote sensing image from a Fengyun-4 satellite to obtain a preprocessed remote sensing image, and dividing the preprocessed remote sensing image by using a convolutional neural network into a thin cloud area and a thick cloud area;

removing thin clouds in the thin cloud area by using homomorphic filtering, and removing thick clouds in the thick cloud area by a replacement method, to thereby obtain a cloud-removed remote sensing image;

extracting a first water body area from the cloud-removed remote sensing image to obtain a first urban inundation extent;

acquiring a radar image at a same region and a same time, and extracting a second water body area from the radar image by using a maximum between-class variance method to obtain a second urban inundation extent; and training a super-resolution convolutional neural network according to the first urban inundation extent and the second urban inundation extent to obtain a trained super-resolution convolutional neural network, and using the trained super-resolution convolutional neural network to obtain a reconstructed higher-resolution urban flood inundation extent.

In the embodiment, the Fengyun-4 satellite FY4A advanced geosynchronous radiation imager (AGRI) data from the national satellite meteorological center is used as the remote sensing image source, which has advantages of wide coverage, high timeliness, and large information volume, but only includes visible and near-infrared bands and cannot fully meet the dependency of the water index model on mid-infrared and shortwave infrared bands. Taking the Fengyun-4 AGRI sensor as an example, the resolution of the Fengyun-4 AGRI sensor ranges from 0.5 to 4 kilometers (km), thus the satellite remote sensing image suffers from insufficient spatial resolution. Radar images have higher spatial resolution, enabling precise extraction of flood inundation extents, but their revisit period is relatively long. For example, the Sentinel-2 radar has a revisit period of five days, which cannot meet the timeliness requirements of flood disaster monitoring. To compensate for the spatial resolution deficiency of the Fengyun-4 satellite optical imagery, the disclosure proposes combining the Fengyun-4 satellite optical imagery with the Sentinel-2 radar imagery, which has higher spatial but lower temporal resolution, and applying deep learning-based super-resolution processing to obtain the urban flood inundation image that satisfies both temporal and spatial resolution requirements during the disaster period.

In an embodiment, preprocessing the remote sensing image from the Fengyun-4 satellite includes normalization, cropping, and other preprocessing operations. Then, a convolutional neural network is used to classify thin and thick cloud remote sensing images. The preprocessed remote sensing image is input into the convolutional neural network, convolution operations are first performed on the input image by multiple convolution kernels to extract local features; then pooling operations are performed on a feature map output by the convolution layer to reduce dimensions of the feature map and computational load; feature vectors output by the pooling layer are input into the fully connected layer, where connections among neurons and the activation function enable classification of thin clouds and thick clouds; and the classification results are output to determine whether the input remote sensing image areas are thin clouds or thick clouds. It is noted that prior to the classification, the convolutional neural network must be trained using a training dataset to enable its ability to classify thin and thick clouds.

In an embodiment, remote sensing satellites (such as moderate resolution imaging spectroradiometer, visible infrared imaging radiometer suite, FY-4 AGRI, etc.) typically obtain the optical thickness $\tau$ of clouds through inversion. The thin clouds, such as cirrus and thin cirrostratus, have an optical thickness less than 3 ($\tau<3$), and have high radiation transmittance, allowing the surface or the outline of the sun/moon to be visible. Moderate clouds, with an optical thickness in a range of 3-10 ($3 \leq \tau \leq 10$), partially obscure the ground surface and have moderate transmittance. The thick clouds, such as stratocumulus, cumulonimbus, and thick layered clouds, with an optical thickness greater than 10 ($\tau>10$, or $\tau>20$ as a standard for the thick clouds in some studies), strongly reflect and absorb radiation, and are opaque.

In an embodiment, the removing thin clouds in the thin cloud area by using homomorphic filtering includes:

decomposing the thin cloud area of the remote sensing image into multiple single-band remote sensing images, and removing the thin clouds from the multiple single-band remote sensing images separately.

In an embodiment, the removing the thin clouds from the multiple single-band remote sensing images separately includes the following steps.

A mathematical model of the thin cloud area of the remote sensing image is as follows:

$$f_s(x, y) = f_i(x, y) \times f_r(x, y),$$

where a two-dimensional function $f_s(x,y)$ represents the thin cloud area of the remote sensing image, with a value being a positive scalar value, where x and y represent position coordinates of each pixel on a two-dimensional remote sensing image; $f_i(x,y)$ represents an incident component contained in the remote sensing image, the incident component refers to a total amount of light source incident on the target region, mainly including the low-frequency spectral characteristics, with slow spatial variation, and is also referred to as a thin cloud illumination component; and $f_r(x,y)$ represents a reflected component contained in the remote sensing image; the reflection component refers to a total amount of radiation light emitted by ground objects in the target region, mainly including the high-frequency spectral characteristics, containing the detailed information of the remote sensing image, and is also referred to as a ground reflection component; where $f_r(x,y)$ should satisfy $0 < f_r(x, y) < 1$. The process of thin cloud removal in the remote sensing image is essentially a process of removing $f_i(x,y)$ and obtaining $f_r(x,y)$.

To process cloud information, the degradation model of thin clouds must first be transformed into the frequency domain. The thin cloud area of the remote sensing image is transformed logarithmically to separate the thin cloud illumination component and the ground reflection component of the remote sensing image to obtain a logarithmic transformation result $\mathrm{Inf}_s(x,y)$, and logarithmic transformation results $\mathrm{Inf}_i(x,y)$ and $\mathrm{Inf}_r(x,y)$, through the following formula:

$$Inf_s(x, y) = Inf_i(x, y) + Inf_r(x, y)$$

In order to reduce the influence of the thin clouds, the spectrum component of $f_i(x,y)$ can be reduced in the frequency domain by reducing the illumination component of the thin clouds. A Fourier transform is performed on the logarithmic transformation result $Inf_s(x,y)$ to reduce the thin cloud illumination component to obtain a Fourier transform result $S(u,v)$, through the following formulas:

$$F\{Inf_s(x, y)\} = F\{Inf_i(x, y)\} + F\{Inf_r(x, y)\},$$

$$\text{let } S(u, v) = F\{Inf_s(x, y)\}, I(u, v) = F\{Inf_i(x, y)\},$$

$$R(u, v) = F\{Inf_r(x, y)\}, \text{ then obtaining:}$$

$$S(u, v) = I(u, v) + R(u, v).$$

A high-pass filter is used to suppress a low-frequency component $I(u,v)$ and extract a high-frequency component $R(u,v)$ of the Fourier transform result $S(u,v)$ to obtain a high-pass filtered result, through the following formula:

$$p(u, v) = S(u, v) \times H(u, v) = I(u, v) \times H(u, v) + R(u, v) \times H(u, v),$$

where $H(u,v)$ represents a transfer function of the high-pass filter;

The frequency amplitude definition is as follows. The physical significance of the frequency coordinates $(u, v)$ is the spatial change rate of the image in the horizontal and vertical directions, with the unit that can be expressed as "cycles per pixel". $D(u, v)$ represents the Euclidean distance from the point $(u, v)$ to the center of the spectrum $(0, 0)$, reflecting the spatial frequency of the corresponding component. N and M respectively represent the number of pixels in the width and height of the image, and thus the range of the cutoff frequency $D_o$ is as follows:

$$0 < D_0 < \sqrt{\left(\frac{N}{2}\right)^2 + \left(\frac{M}{2}\right)^2}$$

An ideal high-pass filter is used in the embodiment, whose transfer function is defined as:

$$H(u, v) = \begin{cases} 0, & D(u, v) \le D_0 \\ 1, & D(u, v) > D_0 \end{cases};$$

when $D(u, v)$ is less than or equal to the cutoff frequency $D_0$, the point is considered a low-frequency component and is filtered out ($H=0$); and when $D(u, v)$ is greater than the cutoff frequency $D_0$, the point is considered a high-frequency component and is retained ($H=1$).

An inverse Fourier transform is performed on the high-pass filtered result $p(u,v)$ to obtain an inverse Fourier transform result $p(x,y)$, through the following formulas:

$$p(x, y) = F^{-1}\{p(u, v)\} = F^{-1}\{I(u, v) \times H(x, y)\} + F^{-1}\{R(u, v) \times H(x, y)\},$$

-continued $$\text{let } i(x, y) = F^{-1}\{I(u, v) \times H(x, y)\},$$

$$r(x, y) = F^{-1}\{R(u, v) \times H(x, y)\}, \text{ then obtaining}$$

$$p(x, y) = i(x, y) + r(x, y),$$

An exponential transformation is performed on the inverse Fourier transform result $p(x,y)$, through the following formula:

$$g(x, y) = \exp\{i(x, y)\} + \exp\{r(x, y)\},$$

$$\text{let } i_0(x, y) = \exp\{i(x, y)\}, r_0(x, y) = \exp\{r(x, y)\},$$

where $i_0(x,y)$ represents a processed thin cloud illumination component, and $r_0(x,y)$ represents a processed ground reflection component; where an expression of the remote sensing image after removing the thin clouds by using the homomorphic filtering is:

$$g(x, y) = i_0(x, y) + r_0(x, y).$$

In an embodiment, the removing thick clouds in the thick cloud area by a replacement method includes:

obtaining a cloud-free remote sensing image and a cloud-covered remote sensing image at the same region captured by the Fengyun-4 satellite at different times or by different sensors, performing geocoding to ensure that coordinate systems of the cloud-free remote sensing image and the cloud-covered remote sensing image are consistent, and replacing cloud-covered areas in the cloud-covered remote sensing image with corresponding areas from the cloud-free remote sensing image on registered remote sensing images.

In an embodiment, the extracting a first water body area from the cloud-removed remote sensing image to obtain a first urban inundation extent includes:

calculating, based on cloud-removed remote sensing image data, a modified normalized difference water index (MNDWI) using a green-band reflectance and a short-wave infrared band reflectance, through the following formula:

$$MNDWI = \frac{\rho_{Green} - \rho_{MIR}}{\rho_{Green} + \rho_{MIR}},$$

where $\rho_{Green}$ represents the green-band reflectance, and $\rho_{MIR}$ represents the short-wave infrared band reflectance;

classifying a part of the cloud-removed remote sensing image with the MNDWI greater than a threshold $MNDWI_0$ as a first target water body, classifying another part of the cloud-removed remote sensing image with the MNDWI less than or equal to the threshold as a first background, and determining the part of the cloud-removed remote sensing image corresponding to the first target water body as the first urban inundation extent; and calculating, based on the first target water body, the first water body area using the following formula:

$$A_w = \frac{P_w A_{total}}{P_{total}},$$

where $P_w$ represents a number of water pixels in a study region, $P_{total}$ represents a total number of pixels in the study region, $A_w$ represents the first water body area in the study region, and $A_{total}$ represents a total image area of the study region;

In an embodiment, the extracting a second water body area from the radar image by using a maximum between-class variance method to obtain a second urban inundation extent includes:

converting the radar image into a grayscale image and performing normalization on the grayscale image to map pixel values of the grayscale image into a range of 0-255;

counting a number of pixels at each gray level in the grayscale image to form a gray-level histogram;

calculating a total number N of pixels in the grayscale histogram, through the following formula:

$$N = \sum (n_i)$$

where $n_i$ represents a total number of pixels with a gray level i in the grayscale histogram, and i is in a range of 0-255;

calculating a probability of each gray level, through the following formula:

$$pi = n_i / N$$

dividing the pixels in the grayscale histogram into two classes according to a pixel value threshold $t_0$, where a pixel set with pixel values less than $t_0$ is recorded as a class A, and a pixel set with pixel values greater than or equal to $t_0$ is recorded as a class B;

calculating a weight $p_A(t)$ of the class A and a weight $p_B(t)$ of the class B, through the following formulas:

$$p_A(t) = \sum_{0 \le i < t_0} p_i,$$

$$p_B(t) = \sum_{t_0 \le i < 225} p_i,$$

calculating a grayscale mean $m_A(t)$ of the class A and a grayscale mean $m_B(t)$ of the class B through the following formulas:

$$m_A(t) = \frac{\sum_{0 \le i < t_0} (i \times p_i)}{P_A(t)},$$

$$m_B(t) = \frac{\sum_{t_0 \le i < 225} (i \times p_i)}{P_B(t)},$$

calculating a grayscale mean of the grayscale image through the following formula:

$$m_G = \sum_{0 \le i < 225} (i \times p_i),$$

calculating a between-class variance between the class A and the class B through the following formula:

$$\sigma^2 = p_A(t) \times (m_A(t) - m_G)^2 + p_B(t) \times (m_B(t) - m_G)^2,$$

traversing all target pixel value thresholds $t_0$ from 0 to 255, calculating the between-class variance $\sigma^2$ corresponding to each of the target pixel value thresholds, that is, repeating steps from the dividing the pixels in the grayscale histogram into two classes according to a pixel value threshold $t_0$ to the calculating a between-class variance between the class A and the class B; and finding a pixel value threshold t* of the target pixel value thresholds corresponding to a maximum between-class variance $\sigma^2$ of the between-class variances $\sigma^2$ corresponding to the target pixel value thresholds; and binarizing the grayscale image using the pixel value threshold t* of the target pixel value thresholds corresponding to the maximum between-class variance $\sigma^2$, including: setting pixels with pixel values less than t* to 0 to represent a second background, and setting pixels with pixel values greater than or equal to t* to 255 to represent a second target water body; and determining a part of the radar image corresponding to the second target water body as the second urban inundation extent; and calculating the second water body area based on the second target water body, through the following formula:

$$A_w = \frac{P_w A_{total}}{P_{total}},$$

where $P_w$ represents a number of water pixels in a study region, $P_{total}$ represents a total number of pixels in the study region, $A_w$ represents the first water body area in the study region, and $A_{total}$ represents a total image area of the study region.

In an embodiment, the training a super-resolution convolutional neural network according to the first urban inundation extent and the second urban inundation extent to obtain a trained super-resolution convolutional neural network includes:

using the first urban inundation extent as an input of the super-resolution convolutional neural network, and the second urban inundation extent as an output of the super-resolution convolutional neural network, to train the super-resolution convolutional neural network to obtain the trained super-resolution convolutional neural network.

The super-resolution of a low-resolution optical remote sensing image is realized based on the super-resolution convolutional neural network, and the implementation process includes the following steps.

A low-resolution urban inundation extent image extracted from the Fengyun-4 satellite remote sensing image is denoted as an image Y. First, the image Y is upsampled to the required size using bicubic interpolation for preprocessing. The purpose of using the super-resolution convolutional neural network is to recover an image F(Y) from the image Y that is as similar as possible to the ground-truth high-resolution image X. For convenience, Y is referred to as the low-resolution image, which has the same size as X.

(1) Patch Extraction and Representation are Performed.

Overlapping patches are extracted from the low-resolution image Y, and each patch represents a high-dimensional vector. These high-dimensional vectors contain a set of feature maps, the number of which is equal to the vector dimension (2) Nonlinear Mapping is Performed.

Each high-dimensional vector is nonlinearly mapped to another high-dimensional vector. Conceptually, each mapped vector represents a high-resolution patch, and these vectors constitute another set of feature maps.

(3) Reconstruction is Performed.

The above high-resolution patch representations are aggregated to generate a high-resolution image F (Y). This high-resolution image F (Y) is similar to the ground-truth high-resolution image X.

In an embodiment, the using the trained super-resolution convolutional neural network to obtain a reconstructed higher-resolution urban flood inundation extent includes:

inputting the remote sensing image into the trained super-resolution convolutional neural network to obtain the reconstructed higher-resolution urban inundation extent.

Figure 3:
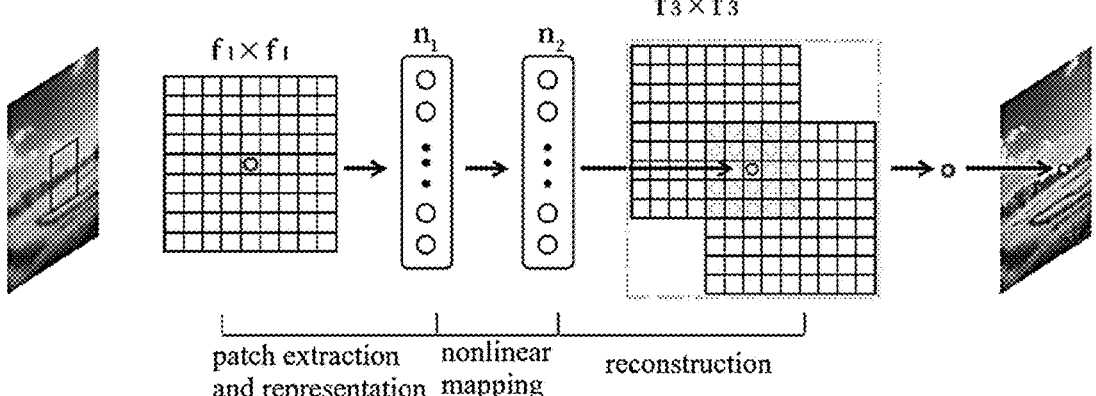
FIG. 3 illustrates an overview of the super-resolution convolutional neural network.

Specifically, as shown in FIGS. 2-3, the process of realizing super-resolution of the low-resolution optical remote sensing image using the super-resolution convolutional neural network is as follows.

(1) Assuming that a low-resolution patch of size f1×f1 is extracted from the image Y, a sparse coding solver projects the low-resolution patch onto a low-resolution dictionary. If the low-resolution dictionary has a size of $n_1$, it is equivalent to applying $n_1$ number of linear filters (f1×f1) on the input image, that is, convolving the image with a set of filters. The first layer is denoted by an operation F1, and the expression is:

$$F1(Y) = \max(0, W1^* Y + B1),$$

where W1 and B1 represent the corresponding filter and bias respectively, and * represents the convolution operation.

(2) Then, the sparse coding solver will iteratively process the n1 coefficients. The output of the sparse coding solver is $n_2$ coefficients. In the case of sparse coding, $n_2 = n_1$, $n_2$ is usually the representation of the high-resolution patch. The second layer of nonlinear mapping is represented by F2, through the following formula:

$$F2(Y) = \max(0, W2^* F1(Y) + B2),$$

where W2 and B2 represent the corresponding filter and bias respectively.

The $n_2$ coefficients after the sparse coding are projected onto another high-resolution dictionary to generate a high-resolution patch. Averaging the overlapping high-resolution patches is equivalent to performing linear convolution on the $n_2$ feature maps. The third layer operation F3 defines a convolution layer to generate the final high-resolution image, which is expressed as:

$$F3(Y) = W3^* F2(Y) + B3,$$

where W3 and B3 represent the corresponding filter and bias respectively.

(3) Training is performed: learning the end-to-end mapping function F requires estimating the network parameters 0={W1; W2; W3; B1; B2; B3} to minimize the loss between the reconstructed image F(Y; θ) and the corresponding ground truth high-resolution image X. Given a set of high-resolution images {$X_i$} and their corresponding low-resolution images {$Y_i$}, the mean squared error (MSE) is used as the loss function, expressed as follows:

$$L(\theta) = \frac{1}{n} \sum_{i=1}^{n} \|F(Y_i; \theta) - X_i\|^2$$

where n is the number of training samples. Using the MSE as the loss function is conducive to obtaining a higher peak signal-to-noise ratio (PSNR) and determining the mapping vector that can obtain the minimum MSE.

(4) Super-resolution is realized: the urban flooding extent image with lower spatial resolution is input into the super-resolution convolutional neural network to obtain a reconstructed urban flooding extent image with higher resolution.

What is claimed is:

1. A method for extracting urban flood inundation extent based on remote sensing images, comprising:

acquiring and preprocessing a remote sensing image from a Fengyun-4 satellite to obtain a preprocessed remote sensing image, and dividing the preprocessed remote sensing image by using a convolutional neural network into a thin cloud area and a thick cloud area;

removing thin clouds in the thin cloud area by using homomorphic filtering, and removing thick clouds in the thick cloud area by using a replacement method, to thereby obtain a cloud-removed remote sensing image;

extracting a first water body area from the cloud-removed remote sensing image to obtain a first urban inundation extent;

acquiring a radar image at a same region and a same time, and extracting a second water body area from the radar image by using a maximum between-class variance method to obtain a second urban inundation extent; and training a super-resolution convolutional neural network according to the first urban inundation extent and the second urban inundation extent to obtain a trained super-resolution convolutional neural network, and using the trained super-resolution convolutional neural network to obtain a reconstructed higher-resolution urban flood inundation extent;

wherein the extracting a first water body area from the cloud-removed remote sensing image to obtain a first urban inundation extent comprises:

calculating, based on cloud-removed remote sensing image data, a modified normalized difference water index (MNDWI) according to a green-band reflectance and a red-band reflectance, through the following formula:

$$MNDWI = \frac{\rho_{Green} - \rho_{MIR}}{\rho_{Green} + \rho_{MIR}}$$

where $\rho_{Green}$ represents the green-band reflectance, and $\rho_{MIR}$ represents a mid-infrared band reflectance;

classifying a part of the cloud-removed remote sensing image with the MNDWI greater than a threshold $MNDWI_0$ as a first target water body, classifying another part of the cloud-removed remote sensing image with the MNDWI less than or equal to the threshold as a first background, and determining the part of the cloud-removed remote sensing image corresponding to the first target water body as the first urban inundation extent; and calculating, based on the first target water body, the first water body area using the following formula:

$$A_w = \frac{P_w A_{total}}{P_{total}},$$

where $P_w$ represents a number of water pixels in a study region, $P_{total}$ represents a total number of pixels in the study region, $A_w$ represents the first water body area in the study region, and $A_{total}$ represents a total image area of the study region;

wherein the extracting a second water body area from the radar image by using a maximum between-class variance method to obtain a second urban inundation extent comprises:

converting the radar image into a grayscale image and performing normalization on the grayscale image to map pixel values of the grayscale image into a range of 0-255;

counting a number of pixels at each gray level in the grayscale image to form a gray-level histogram;

calculating a total number N of pixels in the grayscale histogram through the following formula:

$$N = \sum (n_i)$$

where $n_i$ represents a total number of pixels with a gray level i in the grayscale histogram, and i is in a range of 0-255;

calculating a probability of each gray level, through the following formula:

$$p_i = n_i / N$$

dividing the pixels in the grayscale histogram into two classes according to a pixel value threshold $t_0$, where a pixel set with pixel values less than $t_0$ is recorded as a class A, and a pixel set with pixel values greater than or equal to $t_0$ is recorded as a class B;

calculating a weight $p_A(t)$ of the class A and a weight $p_B(t)$ of the class B, through the following formulas:

$$p_A(t) = \sum_{0 \le i < t_0} p_i,$$

-continued
$$p_B(t) = \sum_{t_0 \le i < 225} p_i,$$

calculating a grayscale mean $m_A(t)$ of the class A and a grayscale mean $m_B(t)$ of the class B through the following formulas:

$$m_A(t) = \frac{\sum_{0 \le i < t_0} (i \times p_i)}{P_A(t)},$$

$$m_B(t) = \frac{\sum_{t_0 \le i < 225} (i \times p_i)}{P_B(t)},$$

calculating a grayscale mean of the grayscale image through the following formula:

$$m_G = \sum_{0 \le i \le 255} (i \times p_i),$$

calculating a between-class variance between the class A and the class B through the following formula:

$$\sigma^2 = p_A(t) \times (m_A(t) - m_G)^2 + p_B(t) \times (m_B(t) - m_G)^2,$$

traversing all target pixel value thresholds to from 0 to 255, calculating the between-class variance $\sigma^2$ corresponding to each of the target pixel value thresholds, and finding a pixel value threshold t* of the target pixel value thresholds corresponding to a maximum between-class variance $\sigma^2$ of the between-class variances $\sigma^2$ corresponding to the target pixel value thresholds; and binarizing the grayscale image using the pixel value threshold t* of the target pixel value thresholds corresponding to the maximum between-class variance $\sigma^2$, comprising: setting pixels with pixel values less than t* to 0 to represent a second background, and setting pixels with pixel values greater than or equal to t* to 255 to represent a second target water body; and determining a part of the radar image corresponding to the second target water body as the second urban inundation extent; and calculating the second water body area based on the second target water body.

2. The method for extracting urban flood inundation extent based on the remote sensing images according to claim 1, wherein the removing thin clouds in the thin cloud area by using homomorphic filtering comprises:

decomposing the thin cloud area of the remote sensing image into a plurality of single-band remote sensing images, and removing the thin clouds from the plurality of single-band remote sensing images separately.

3. The method for extracting urban flood inundation extent based on the remote sensing images according to claim 2, the removing the thin clouds from the plurality of single-band remote sensing images separately comprises:

modeling the thin cloud area of the remote sensing image mathematically as:

$$f_s(x, y) = f_i(x, y) \times f_r(x, y),$$

where a two-dimensional function $f_s(x,y)$ represents the thin cloud area of the remote sensing image, where x and y represent position coordinates of each pixel on a two-dimensional remote sensing image; $f_i(x,y)$ represents an incident component contained in the remote sensing image as a thin cloud illumination component, and $f_r(x,y)$ represents a reflected component contained in the remote sensing image as a ground reflection component;

transforming logarithmically the thin cloud area of the remote sensing image to separate the thin cloud illumination component and the ground reflection component of the remote sensing image to obtain a logarithmic transformation result $\text{Inf}_s(x,y)$, through the following formula:

$$Inf_s(x, y) = Inf_i(x, y) + Inf_r(x, y),$$

performing a Fourier transform on the logarithmic transformation result $\text{Inf}_s(x,y)$ to reduce the thin cloud illumination component to obtain a Fourier transform result $S(u,v)$, through the following formulas:

$$F\{Inf_s(x, y) = F\{Inf_i(x, y)\} + F\{Inf_r(x, y),$$

$$\text{let } S(u, v) = F\{Inf_s(x, y)\},\ I(u, v) = F\{Inf_i(x, y)\},$$

$$R(u, v) = F\{Inf_r(x, y)\},\ \text{then obtaining:}$$

$$S(u, v) = I(u, v) + R(u, v),$$

using a high-pass filter to suppress a low-frequency component $I(u,v)$ and extract a high-frequency component $R(u,v)$ of the Fourier transform result $S(u,v)$ to thereby obtain a high-pass filtered result, through the following formulas:

$$p(u, v) = S(u, v) \times H(u, v) = I(u, v) \times H(u, v) + R(u, v) \times H(u, v),$$

where $H(u,v)$ represents a transfer function of the high-pass filter;

performing an inverse Fourier transform on the high-pass filtered result $p(u,v)$ to obtain an inverse Fourier transform result $p(x,y)$, through the following formulas:

$$p(x, y) = F^{-1}\{(u, v)\} = F^{-1}\{I(u, v) \times H(x, y)\} + F^{-1}\{R(u, v) \times H(x, y)\},$$

$$\text{let } i(x, y) = F^{-1}\{I(u, v) \times H(x, y)\},\ r(x, y) = F^{-1}\{R(u, v) \times H(x, y)\},$$

$$\text{then obtaining } p(x, y) = i(x, y) + r(x, y),$$

and performing an exponential transformation on the inverse Fourier transform result p(x,y), through the following formulas:

$$g(x, y) = \exp\{i(x, y)\} + \exp\{r(x, y)\},$$

$$\text{let } i_0(x, y) = \exp\{i(x, y)\},\ r_0(x, y) = \exp\{r(x, y)\},$$

where $i_0(x,y)$ represents a processed thin cloud illumination component, and $r_0(x,y)$ represents a processed ground reflection component;

wherein an expression of the remote sensing image after removing the thin clouds by using the homomorphic filtering is:

$$g(x, y) = i_0(x, y) + r_0(x, y).$$

4. The method for extracting urban flood inundation extent based on the remote sensing images according to claim 1, the removing thick clouds in the thick cloud area by using a replacement method comprises:

obtaining a cloud-free remote sensing image and a cloud-covered remote sensing image at the same region captured by the Fengyun-4 satellite at different times or by different sensors, performing geocoding to ensure that coordinate systems of the cloud-free remote sensing image and the cloud-covered remote sensing image are consistent, and replacing cloud-covered areas in the cloud-covered remote sensing image with corresponding areas from the cloud-free remote sensing image on registered remote sensing images.

5. The method for extracting urban flood inundation extent based on the remote sensing images according to claim 1, wherein the training a super-resolution convolutional neural network according to the first urban inundation extent and the second urban inundation extent to obtain a trained super-resolution convolutional neural network comprises:

using the first urban inundation extent as an input of the super-resolution convolutional neural network, and the second urban inundation extent as an output of the super-resolution convolutional neural network, to train the super-resolution convolutional neural network to thereby obtain the trained super-resolution convolutional neural network.

6. The method for extracting urban flood inundation extent based on the remote sensing images according to claim 5, the using the trained super-resolution convolutional neural network to obtain a reconstructed higher-resolution urban flood inundation extent comprises:

inputting the remote sensing image into the trained super-resolution convolutional neural network to obtain the reconstructed higher-resolution urban inundation extent.

\* \* \* \* \*